US012754126B2

(12) United States Patent
Zhang et al.

(10) Patent No.: US 12,754,126 B2
(45) Date of Patent: Oct. 6, 2026

(54) METHOD AND SYSTEM FOR DETERMINING KEY DIMENSION OF LOW-DIMENSIONAL MATERIALS BY OPTICAL SCATTERING

(71) Applicant: SHANDONG UNIVERSITY, Jinan (CN)

(72) Inventors: Jiawei Zhang, Jinan (CN); Baoqing Zhang, Jinan (CN); Aimin Song, Jinan (CN); Zihao Zhang, Jinan (CN); Hu Li, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 154 days.

(21) Appl. No.: 18/750,116

(22) Filed: Jun. 21, 2024

(65) Prior Publication Data

US 2025/0369860 A1 Dec. 4, 2025

(30) Foreign Application Priority Data

May 31, 2024 (CN) ......................... 202410705296.0

(51) Int. Cl.
*G01N 15/1429* (2024.01)
*G01B 11/06* (2006.01)
(Continued)

(52) U.S. Cl.
CPC ......... *G01N 15/1429* (2013.01); *G01B 11/06* (2013.01); *G01B 11/08* (2013.01); *G01N 15/1434* (2013.01); *G01N 2015/1493* (2013.01)

(58) Field of Classification Search
CPC ............... G01N 23/18; G01N 15/1433; G01N 21/8806; G01N 2223/6116;
(Continued)

(56) References Cited

U.S. PATENT DOCUMENTS 5,199,057 A 3/1993 Tamura et al.
10,816,784 B1 * 10/2020 Hantke .............. G01N 15/0211
(Continued)

FOREIGN PATENT DOCUMENTS

CA 2 365 093 A1 1/2000
CN 104568857 A 4/2015
(Continued)

OTHER PUBLICATIONS

Jul. 26, 2023 Office Action issued in Chinese Patent Application No. 202211106087.1.

(Continued)

*Primary Examiner* — Michael P Stafira
(74) *Attorney, Agent, or Firm* — Oliff PLC

(57) ABSTRACT

The present invention discloses a method and system for determining a key dimension of a low-dimensional material by optical scattering. The method includes: controlling a light source to be obliquely incident onto a low-dimensional material to be observed and a substrate at a set angle, wherein the set angle is able to enable a light receiving device located above or below the low-dimensional material to only receive light scattered by the low-dimensional material; converting the received scattered light into an optical image; obtaining a brightness value of each pixel in the optical image, and establishing a correspondence relationship between a position and brightness; calculating a contrast based on the correspondence relationship between the position and the brightness, and determining the key dimension of the low-dimensional material based on a pre-calibrated correspondence relationship between the contrast and the key dimension of the low-dimensional material.

9 Claims, 6 Drawing Sheets

(51) Int. Cl.
*G01B 11/08* (2006.01)
*G01N 15/1434* (2024.01)
*G01N 15/14* (2006.01)

(58) Field of Classification Search
CPC ....... G01N 15/0227; G01N 2021/4771; G01N 15/02; G01N 2223/646; G01N 15/1429; G01N 21/8851; G01N 2021/8488; G01N 21/17; G01N 21/78; G01N 2223/418; G01N 23/2251; G01N 15/1434; G01N 2021/1765; G01N 2223/04; G01N 2223/076; G01N 23/083; G01N 23/223; G01N 15/06; G01N 2223/1016; G01N 23/04; G01N 23/2206; G01N 15/075; G01N 15/147; G01N 2015/1006; G01N 2015/1486; G01N 21/57; G01N 21/6428; G01N 21/6456; G01N 21/9501; G01N 2223/419; G01N 33/50; G01N 33/5005; G01N 33/54366; G01N 2015/1452; G01N 2015/1493; G01N 21/01; G01N 21/27; G01N 21/31; G01N 21/3563; G01N 21/64; G01N 21/95; G01N 2223/401; G01N 2223/6462; G01N 15/00; G01N 15/0625; G01N 2015/0046; G01N 21/25; G01N 21/359; G01N 21/88; G01N 21/9515; G01N 2223/071; G01N 2223/6113; G01N 2223/651; G01N 23/046; G01N 2458/00; G01N 33/54306; G01N 33/6854; G01N 15/01; G01N 15/0618; G01N 15/1404; G01N 15/1427; G01N 15/1468; G01N 2015/1027; G01N 2015/1029; G01N 2015/144; G01N 2015/1445; G01N 2015/1472; G01N 2015/1477; G01N 2015/1497; G01N 2021/1776; G01N 2021/3174; G01N 2021/4735; G01N 2021/6421; G01N 2021/6491; G01N 2021/8557; G01N 2021/8829; G01N 2021/8883; G01N 2021/8887; G01N 21/21; G01N 21/251; G01N 21/274; G01N 21/276; G01N 21/3518; G01N 21/3554; G01N 21/47; G01N 21/4788; G01N 21/51; G01N 21/55; G01N 21/84; G01N 21/86; G01N 21/9027; G01N 21/956; G01N 2201/0221; G01N 2201/063; G01N 2201/065; G01N 2201/1087; G01N 2223/635; G01N 2223/641; G01N 2291/0258; G01N 23/2204; G01N 29/00; G01N 29/14; G01N 29/4436; G01N 33/15; G01N 33/4833; G01N 33/5091; G01N 1/4077; G01N 15/0612; G01N 2021/6439; G01N 2021/8825; G01N 2021/8861; G01N 2021/8912; G01N 2021/9544; G01N 21/07; G01N 21/49; G01N 21/59; G01N 21/75; G01N 21/76; G01N 21/89; G01N 21/8903; G01N 21/94; G01N 21/954; G01N 21/95607; G01N 21/95623; G01N 2201/0662; G01N 2223/053; G01N 2223/102; G01N 2223/304; G01N 2223/306; G01N 2223/423; G01N 2223/611; G01N 23/203; G01N 27/62; G01N 33/566; G01N 33/56972; G01N 35/00069; G01N 35/0098; G01N 35/025; G02B 27/0172; G02B 2027/0178; G02B 27/0093; G02B 2027/0187; G02B 2027/0174; G02B 27/01; G02B 27/0103; G02B 27/017; G02B 2027/0138; G02B 2027/014; G02B 21/365; G02B 21/367; G02B 26/06; G02B 2027/0112; G02B 2027/0118; G02B 21/0032; G02B 21/0076; G02B 21/008; G02B 26/10; G02B 26/103; G02B 27/0101; G02B 27/145; G02B 21/0004; G02B 21/0036; G02B 21/004; G02B 21/0068; G02B 21/0096; G02B 21/06; G02B 26/101; G02B 27/0179; G02B 27/104; G02B 27/106; G02B 5/3083; G02B 2027/0123; G02B 2027/0141; G02B 2027/0185; G02B 21/10; G02B 21/14; G02B 21/16; G02B 21/34; G02B 27/0081; G02B 27/1046; G02B 27/1053; G02B 27/1066; G02B 27/141; G02B 27/283; G02B 27/48; G02B 3/0037; G02B 3/14; G02B 7/287; G02B 2027/011; G02B 2027/0125; G02B 2027/013; G02B 21/0008; G02B 21/086; G02B 21/26; G02B 26/0816; G02B 26/0833; G02B 27/0075; G02B 27/142; G02B 27/286; G02B 5/18; G02B 5/26; G02B 5/28; G02B 5/30; G02B 5/3025; G02B 5/305; G02B 6/00; G02B 6/0001; G02B 6/0096; G02B 7/36; G01J 9/00; G01J 3/2803; G01J 3/2823; G01J 3/36; G01J 3/51; G01J 3/02; G01J 3/0208; G01J 3/0297; G01J 3/28; G01J 3/4406; G01J 3/52; G01J 3/524; G01J 1/0429; G01J 2003/2806; G01J 2003/2826; G01J 3/46; G01J 3/463; G01J 3/506; G01J 5/004; G01J 5/53; G01J 5/605; G01B 11/08; G01B 11/00; G01B 11/24; G01B 11/25; G01B 11/2513; G01B 11/005; G01B 11/06; G01B 11/14; G01B 11/30; G01B 11/0625; G01B 2290/70; G01B 9/02056; G01B 9/02081; G01B 11/03; G01B 11/22; G01B 11/2433; G01B 11/2518; G01B 11/2531; G01B 11/254; G01B 11/2545; G01B 11/28; G01B 15/04; G01B 2210/56
See application file for complete search history.

(56) References Cited

U.S. PATENT DOCUMENTS

| | | | | | |
|---|---|---|---|---|---|
| 12,037,246 | B2 * | 7/2024 | Ifuku | G01N 21/21 | |
| 2007/0046938 | A1 * | 3/2007 | Adams | G01N 15/1433 | 356/343 |
| 2011/0076467 | A1 * | 3/2011 | Huang | G01N 21/6458 | 430/311 |
| 2013/0043386 | A1 * | 2/2013 | Yamazaki | G01N 23/04 | 250/311 |
| 2013/0100433 | A1 * | 4/2013 | Frose | G01N 30/74 | 356/343 |
| 2016/0025645 | A1 * | 1/2016 | Huang | G01N 21/9501 | 356/237.2 |

FOREIGN PATENT DOCUMENTS

| | | | | | |
|---|---|---|---|---|---|
| CN | 104819973 | A | * | 8/2015 | |
| CN | 105158158 | A | * | 12/2015 | |
| CN | 106707484 | A | | 5/2017 | |
| CN | 107462592 | A | * | 12/2017 | G01N 23/20 |
| CN | 109459426 | A | | 3/2019 | |
| CN | 109580542 | A | | 4/2019 | |

(56) References Cited

FOREIGN PATENT DOCUMENTS

| | | | | | |
|---|---|---|---|---|---|
| CN | 110987817 | A | | 4/2020 | |
| CN | 111694082 | A | * | 9/2020 | ........... G02B 5/1847 |
| CN | 111982945 | A | | 11/2020 | |
| CN | 110987817 | B | * | 1/2021 | ........... G01N 21/211 |
| CN | 114396888 | A | * | 4/2022 | ............. G01N 21/55 |
| CN | 116297337 | A | * | 6/2023 | ............. G01N 21/47 |
| CN | 120233643 | A | * | 7/2025 | ......... H01L 21/0277 |
| CN | 120236967 | A | * | 7/2025 | .......... H01J 37/1472 |
| EP | 3282468 | A1 | * | 2/2018 | ......... G01N 23/2251 |
| JP | 2010043987 | A | * | 2/2010 | |
| JP | 2017211317 | A | * | 11/2017 | |
| JP | 2020526929 | A | * | 8/2020 | ............ H10P 74/203 |
| KR | 20180047762 | A | * | 5/2018 | ............... G06T 7/90 |
| KR | 102625635 | B1 | * | 1/2024 | ....... G01N 23/20025 |
| WO | WO-2015152483 | A1 | * | 10/2015 | ........... G01N 23/207 |
| WO | WO-2021165661 | A1 | * | 8/2021 | ........... G02B 21/361 |
| WO | 2022/062773 | A1 | | 3/2022 | |
| WO | WO-2023108057 | A1 | * | 6/2023 | ......... G01B 11/0633 |

OTHER PUBLICATIONS

Jul. 25, 2023 Search Report issue in Chinese Patent Application No. 202211106087.1.

Zhang, Xuan, et al. "High Contrast Dark Field Imaging Method for Detecting Optical Surface". Mechanical & Electrical Technology, 86-87 & 108, 2019.

Zhang, Xiangxiang. "Imaging Technology in Modern Microsystems", Optical Instruments, vol. 37, No. 6, 550-560, 2015.

Yao, Yaxuan, et al. "Progress in Measuremental Methods for Layer Numbers of Graphene", vol. 78, No. 2, Chemistry, 100-106, 2015.

Wang, Hua-Guang, et al. "Application of Video Microscopy in Experimental Soft Matter Physics", Acta Phys. Sin., vol. 65, No. 17, 178705-1-178705-14, 2016.

Yamashita, Shunsuke, et al. "Quantitative Annular Dark-Field Imaging of Single-Layer Graphene—II: Atomic-Resolution Image Contrast", Microscopy, vol. 64, No. 6, 409-418, 2015.

Peng, Bo, et al. "Research and Implementation of Enhancement Algorithm for Low-Illumination Image", Computer Applications, vol. 27, No. 8. 2007, 3 pages.

Liu, Lui, et al. "Optimal Design of Dark Field Illumination Based on Colony Selection Device", Optical Technique, vol. 43, No. 3, 243-247, 2017.

Ping, Jinglei, et al. "Layer Number and Stacking Sequence Imaging of Few-Layer Graphene by Transmission Electron Microscopy", Nano Letters, No. 12, 4635-4641, 2012.

Han, Wen-Peng, et al. "The Numerical-Aperture-Dependent Optical Contrast and Thickness Determination of Ultrathin Flakes of Two-Dimensional Atomic Crystals: a Case of Graphene Multilayers*", Acta Phys. Sin., vol. 62, No. 11, 110702-1-110702-7, 2013.

Fu, Zhengfang, et al. "Direct Fusion Algorithm Multi-Exposed Images Based on Sigmoid Function Fitting", Chinese Journal of Scientific Instrument, vol. 36, No. 10, 2321-2329, 2015.

Dong, Qiaoxue, et al. "Image-Based Light Environment Distribution in Greenhouse", Transactions of the CSAE, vol. 62. Supp. 2, 294-297, 2010.

* cited by examiner

METHOD AND SYSTEM FOR DETERMINING KEY DIMENSION OF LOW-DIMENSIONAL MATERIALS BY OPTICAL SCATTERING

The present application claims priority to Chinese Patent Application No. 202410705296.0 filed with the National Intellectual Property Administration on May 31, 2024 and entitled "METHOD AND SYSTEM FOR DETERMINING KEY DIMENSION OF LOW-DIMENSIONAL MATERIALS BY OPTICAL SCATTERING". The entire content of the above-referenced disclosure is incorporated herein by reference.

TECHNICAL FIELD

The present invention relates to the technical field of measurement and representation of low-dimensional materials, and in particular, to a method and system for determining a key dimension of low-dimensional materials by optical scattering.

BACKGROUND

The description in this section merely provides background information related to the present invention and does not necessarily constitute the prior art.

A low-dimensional material is a material which is at a nanometer scale or is composed of a few of atoms or even one atom in one or more dimensions. The low-dimensional material has a significant quantum confinement effect in n (n=1, 2, and 3) dimensions, where in case of n=1, the low-dimensional material is a two-dimensional material, typically representing graphene; in case of n=2, the low-dimensional material is a one-dimensional material, typically representing a carbon nano tube, a silver nano wire, and the like; and particularly, in case of n=3, the material exhibits the quantum confinement effect in all dimensions, which is referred to as a zero-dimensional material, typically representing a quantum dot.

Compared with a bulk material (a three-dimensional material), the low-dimensional material has superior performance in some aspects. However, since the low-dimensional material only has a nanometer-level or even atom-level dimension, there are still challenges to accurate representation of key dimensions of the low-dimensional material.

A key dimension of a two-dimensional material is a quantity of atomic layers (or a thickness) of the two-dimensional material. A key dimension of a one-dimensional material is a diameter of a cross section of the one-dimensional material. A key dimension of a zero-dimensional material (generally quasi-sphere) is a diameter of the quasi-sphere. In the related art, methods for detecting a key dimension of a low-dimensional material mainly include: an optical reflection contrast method, a Raman spectroscopy method, an atomic force microscope method, a scanning transmission electron microscope method, a scanning electron microscope method, a dynamic laser scattering method, and the like.

However, these methods for detecting a key dimension of a low-dimensional material disclosed in the related art still have various disadvantages, for example: The optical reflection contrast method has problems of low measurement accuracy, low contrast when an observed sample and a substrate have similar refractive indexes, low contrast during application to a transparent substrate, zero linear relationship between the contrast and a key dimension, and the like. It is difficult to use the optical reflection contrast method to observe a zero-dimensional or a one-dimensional material. The Raman spectroscopy method has problems of expensive construction of a laser source and a related optical path, difficulty in representing a thick sample, high time consumption for mapping scanning, and the like. The atomic force microscope method has problems of long test time and expensive equipment, is easily affected by a substrate and an environment, and the like. The scanning electron microscope method has problems of a change in morphology of a sample caused by electron bombardment, possible irreversible pollution to the sample, and the like. The tunneling electron microscope method has problems of extremely expensive equipment, complex sample preparation operations required for measurement, irreversible damage to a sample, and the like. The dynamic laser scattering method can only represent a statistical result of a particle size in a solution, and cannot be used to detect a particle diameter (in particular, a single particle diameter) of a zero-dimensional material on a substrate.

SUMMARY

To solve the above problems, the present invention provides a method and system for determining a key dimension of low-dimensional materials by optical scattering. By controlling an angle of incidence of a light source, the key dimension of the low-dimensional materials is determined by using an optical scattering intensity. This is suitable for measuring a key dimension of low-dimensional materials on a substrate, and has advantages of high contrast, low cost, low time consumption, adjustability, no damage, high universality, and the like.

In some implementations, the following technical solutions are used:

A method for determining a key dimension of low-dimensional materials by optical scattering is provided, including:

- controlling a light source to be obliquely incident onto a low-dimensional material to be observed and a substrate at a set angle, wherein the set angle is able to enable a light receiving device located above or below the low-dimensional material to be observed to only receive the light scattered by the low-dimensional material to be observed;
- converting the received scattered light into an optical image;
- obtaining a brightness value of each pixel in the optical image, and establishing a correspondence relationship between a position and brightness;
- using a difference value between brightness of the low-dimensional material to be observed and brightness of the substrate as a contrast, wherein the brightness of the low-dimensional material to be observed is a maximum brightness value of a low-dimensional material region; the brightness of the substrate is an average brightness value of a region beyond the low-dimensional material to be observed; and
- calculating a contrast based on the correspondence relationship between the position and the brightness, and determining the key dimension of the low-dimensional material to be observed based on a pre-calibrated correspondence relationship between the contrast and the key dimension of the low-dimensional material to be observed.

When the low-dimensional material to be observed is a two-dimensional material, the key dimension of the two-dimensional material is a thickness or a quantity of atomic layers; and the correspondence relationship between the contrast and the key dimension of the two-dimensional material is:

$$m_{2D} = l_{2D} * d_2^{k2} + s_{2D}$$

wherein, $m_{2D}$ is the contrast of the two-dimensional material; $l_{2D}$ is a parameter related to a type of the two-dimensional material, which is related to a property of the two-dimensional material; $d_2$ is the key dimension of the two-dimensional material; and k2 is a contrast-key dimension fitting coefficient of the two-dimensional material, a value range of which is (1−0.5, 1+0.5); and $s_{2D}$ is a correction parameter.

When the low-dimensional material to be observed is a one-dimensional material, the key dimension of the one-dimensional material is a diameter of a cross section; the correspondence relationship between the contrast and the key dimension of the one-dimensional material is:

$$m_{1D} = l_{1D} * d_1^{k1} + s_{1D}$$

wherein, $m_{1D}$ is the contrast of the one-dimensional material; $l_{1D}$ is a parameter related to a type of the one-dimensional material, which is related to a property of the one-dimensional material; $d_1$ is the key dimension of the one-dimensional material; k1 is a contrast-key dimension fitting coefficient of the one-dimensional material, a value range of which is (2−0.5, 2+0.5); and $s_{1D}$ is a correction parameter.

When the low-dimensional material to be observed is a zero-dimensional material, the key dimension of the zero-dimensional material is a diameter of the zero-dimensional material; the correspondence relationship between the contrast and the key dimension of the zero-dimensional material is:

$$m_{0D} = l_{0D} * d_0^{k0} + s_{0D}$$

wherein, $m_{0D}$ is the contrast of the zero-dimensional material; $l_{0D}$ is a parameter related to a type of the zero-dimensional material, which is related to a property of the zero-dimensional material; $d_0$ is the key dimension of the zero-dimensional material; k0 is a contrast-key dimension fitting coefficient of the zero-dimensional material, a value range of which is (6−3, 6+3); and $s_{0D}$ is a correction parameter.

A system for determining a key dimension of a low-dimensional material by optical scattering is provided, including:

an image obtaining module, configured to: control a light source to be obliquely incident onto a low-dimensional material to be observed and a substrate at a set angle, wherein the set angle is able to enable a light receiving device located above or below the low-dimensional material to be observed to only receive light scattered by the low-dimensional material to be observed; and converting the received scattered light into an optical image;

a position-brightness relationship construction module, configured to: obtain a brightness value of each pixel in the optical image, and establish a correspondence relationship between a position and brightness;

a contrast calculation module, configured to use a difference value between brightness of the low-dimensional material to be observed and brightness of the substrate as a contrast, wherein the brightness of the low-dimensional material to be observed is a maximum brightness value of a low-dimensional material region; the brightness of the substrate is an average brightness value of a region beyond the low-dimensional material to be observed; and a key dimension calculation module, configured to: calculate a contrast based on the correspondence relationship between the position and the brightness, and determine the key dimension of the low-dimensional material to be observed based on a pre-calibrated correspondence relationship between the contrast and the key dimension of the low-dimensional material to be observed.

Compared with the prior art, the present invention has the following beneficial effects:

(1) The present invention provides calculating a contrast between a low-dimensional material to be observed and a substrate by using an optical image converted from scattered light, and establishing a relationship between the contrast and a key dimension of the low-dimensional material to be observed, to solve the key dimension of the low-dimensional material to be observed by using the contrast. Compared with the conventional method for detecting the key dimension of the low-dimensional material to be observed by using optical reflection, the present invention has the advantages that the contrast between the low-dimensional material to be observed and the substrate can reach more than 10 times that of the conventional optical reflection method, so that the contrast effect is significant, and is less affected by the substrate; and accurate measurement of the key dimension of the low-dimensional material to be observed on the substrate can be achieved.

(2) The present invention establishes correspondence relationships between contrasts of zero-dimensional, one-dimensional, and two-dimensional materials in an optical image converted from scattered light and key dimensions of the zero-dimensional, one-dimensional, and two-dimensional materials, so that the key dimension of the low-dimensional materials can be accurately and quantitatively measured. A key dimension of a single particle, which cannot be identified by many ordinary optical methods, can be accurately obtained by using the method of the present invention, and measurement precision is high.

(3) The present invention has the representation cost that is much lower than that of existing common representation means. The existing common representation means include an atomic force microscope, a Raman spectrometer, a scanning electron microscope, a scanning electron transmission microscope, a dynamic optical scattering method, and the like. A cost of a device based on the present method may be controlled at $8,000, and a charge for a single measurement is less than $0.1. However, the price of the atomic force microscope ranges from tens of thousands of dollars to hundreds of thousands of dollars. In addition, a probe of the atomic force microscope is a type of consumable material, and the price of a single probe is greater than $100, so a maintenance fee for an annual comprehensive use is more than $10,000; the price of the Raman spectrometer is hundreds of thousands of dollars or more; and, the prices of the scanning electron microscope and the scanning electron transmission microscope are tens of dollars to millions of dollars or more, and the maintenance cost is tens of thousands of dollars or more per year. Therefore, the present invention has a significant advantage in terms of the device cost and the maintenance cost.

(4) In the present invention, the representation speed is much higher than that of some existing common representation means. Some of the existing common representation means includes an atomic force microscope, a Raman spectrometer, a scanning electron microscope, a scanning electron transmission microscope, a dynamic optical scattering method, and the like. The representation and analysis time of a single sample in the method of the present invention is only a few minutes. The representation time of the atomic force microscope is about half an hour. The Raman spectroscope requires about half an hour to perform laser preheating and substrate calibration. A mapping scanning mode requires at least one hour. The scanning electron microscope takes about one hour for representation. The observation time of a scanning electron transmission microscope system is one hour or longer. Furthermore, it takes about one hour to prepare a sample by using a focused ion beam device. Therefore, the present invention further has a significant advantage in terms of the time cost.

Other features of the present invention and advantages of additional aspects will be set forth in part in the description below, parts of which will become apparent from the description below, or will be understood by the practice of this aspect.

DETAILED DESCRIPTION

It should be noted that the following detailed descriptions are all exemplary and are intended to provide a further understanding of this application. Unless otherwise specified, all technical and scientific terms used in the present invention have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "contain" and/or "include" used in this specification indicate that there are features, steps, operations, devices, components, and/or combinations thereof.

Embodiment I

In one or more implementations, a method for determining a key dimension of low-dimensional materials by optical scattering is disclosed. A contrast is calculated by using brightness of a low-dimensional material to be observed and brightness of a substrate in an optical image converted from scattered light, and the key dimension of the low-dimensional material to be observed is determined based on a relationship between the contrast and the key dimension. Compared with a traditional optical measurement method, the method has advantages of high contrast, low cost, low time consumption, adjustability, no damage, high universality, and the like.

Figure 1:
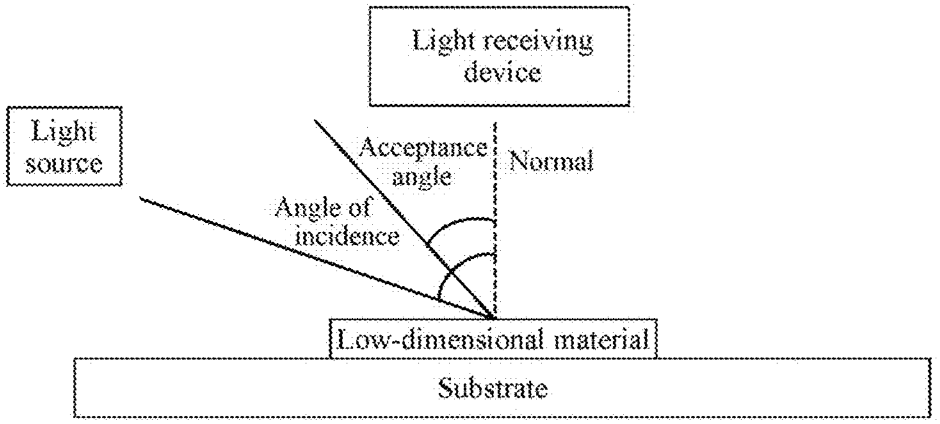
FIG. 1 is a schematic structural diagram of a system for determining a key dimension of a low-dimensional material by optical scattering in an embodiment of the present invention.

In this embodiment, a system for determining a key dimension of low-dimensional materials by using optical scattering is shown in FIG. 1. A low-dimensional material to be observed is arranged on a substrate, and a light receiving device is arranged above or below the substrate and the low-dimensional material to be observed.

In some implementations, a light source may be an electromagnetic wave, and a wavelength may cover all electromagnetic wavelengths.

In some other implementations, a light source may alternatively be an optical wave, and a wavelength of the optical wave covers all optical bands. As a preferable example, an optical band covered by the wavelength of the optical wave emitted by the light source is 1 to 3000 nm (nanometers). As a more preferable example, an optical band covered by the wavelength of the optical wave emitted by the light source is 300 to 800 nm.

In some embodiments, the substrate may be a silicon substrate covered with a silicon dioxide layer. A thickness of the silicon dioxide layer is not particularly required. Or, a silicon substrate covered with another oxide layer may be selected.

In some other embodiments, the substrate may alternatively use another commonly used substrate such as SiC.

As a more preferable example, the substrate may be a transparent substrate. A thickness of the substrate is less than 10000 um (micrometers).

It should be noted that, the low-dimensional materials of this embodiment may include two-dimensional materials, one-dimensional materials, or zero-dimensional materials. The key dimension of the two-dimensional materials is an atomic thickness or a quantity of atomic layers; the key dimension of the one-dimensional materials is a diameter of a cross section of the one-dimensional material; and, the key dimension of the zero-dimensional materials is a diameter of the zero-dimensional material.

It should be understood that, for those low-dimensional materials, a Rayleigh scattering should be the main scattering form of the light scattering, and the Rayleigh scattering happens when a key dimension of scattering object is less than 1/10 of a wavelength of an incidence light. However, the dimensions of the two-dimensional, the one-dimensional, and the zero-dimensional materials all fit this requirement. Additionally, by using a specially designed light path with large incidence angle, the scattered light form the disturbance of the reflected light can be prevented. A theory of the Rayleigh scattering for low-dimensional materials is given below.

According to a classic electric dipole theory, the atoms in dielectric are forced to resonate under the incident light. Supposing the electric dipole is a time (t) harmonic dipole, the electric dipole p can be expressed as:

$$p = ex_0 \cos \omega t$$

wherein, e is the elementary charge, $x_0$ is resonant amplitude of the dipole, ω is the angle frequency.

There are two modifications applied to explain the Rayleigh scattering supported by low-dimensional materials. The first modification is to introduce effective electric dipoles $p_{eff}$. Taking the two-dimensional material as an example, according to Bloch's theorem, atoms of the two-dimensional materials are in periodical potentials. Due to the broken of the symmetry at edges (or defects, like wrinkles), the atoms in these areas have different electric dipoles with the internal area (for one-dimensional and zero-dimensional materials, similar treatment are processed at a lattice symmetry or period of an atom broken are). For the convenience of analysis, $p_{eff}$ is introduced to redefine the electric dipoles at the edges by considering the electric dipoles at the internal area. The treatment is similar to the 'effective mass' of carriers in semiconductors. It should be noted that, $p_{eff}$ is further simplified to a group of atoms, which will bring further convenience to the analysis and calculation.

The far field retarded potential radiation of the electric dipoles can be expressed as:

$$A(r) = \frac{\mu_0}{4\pi r} e^{ikr} p_{eff}$$

wherein, r is the distance to the radiation center, k is the wave vector, and $\mu_0$ is the vacuum permeability.

Hence, a Poynting vector of scattered linear polarized light $\overline{S}$ can be expressed as:

$$\overline{S} = \frac{|\ddot{p}_{eff}|^2}{32\pi^2 \varepsilon_0 c^3 r^2} \sin^2\alpha\square\overline{S_0}$$

wherein, $\varepsilon_0$ is the vacuum permittivity, c is the vacuum light speed. $\overline{S_0}$ is the Poynting vector of the incident light, α is the angle between the optic axis of light receiving device and the incident direction, r is the distance between the two-dimensional materials and the objective lens. For $\ddot{p}=-\omega^2$ p, the intensity of the wave has a second power relationship with p. For $$\omega = \frac{2\pi c}{\lambda},$$

and considering the light is generated by the tungsten light is non-polarized light, the scattered light intensity $\overline{I}$ should be expressed as:

$$\overline{I} = \overline{I_0} \frac{c\pi^2 |p_{eff}|^2}{2\varepsilon_0 r^2 \lambda^4} (1 + \cos^2 \theta)$$

wherein, θ is the angle between the incident direction and the observation direction.

For the zero-dimensional materials, or more specifically the gases with diameter less than 1/10 of the wavelength of the incident light p of each particle (or drop) is related with the volume, $p \propto d^3$, wherein d is the diameter of the particle. As a result, the intensity of the scattered light of gases should have a sixth-power relationship with the zero-dimensional materials.

For one-dimensional materials, the dipole is determined by the atom number of the cross-section, $p \propto d^1$, wherein d is the diameter of the cross-section of one-dimensional materials. As a result, the intensity of the scattered light of gases should have a second power relationship with the diameter of the particle.

For two-dimensional materials, the interlayer vdW forces interaction are much weaker than the intralayer covalent or ionic bonds interactions. Thus, $p_{eff}$ of each atomic layer should be treated separately and regarded as an independent contributor to the Rayleigh scattering. By this modification, a linear relationship is built between the intensity of the Rayleigh scattering and the number of atomic layers of two-dimensional materials.

Figure 2:
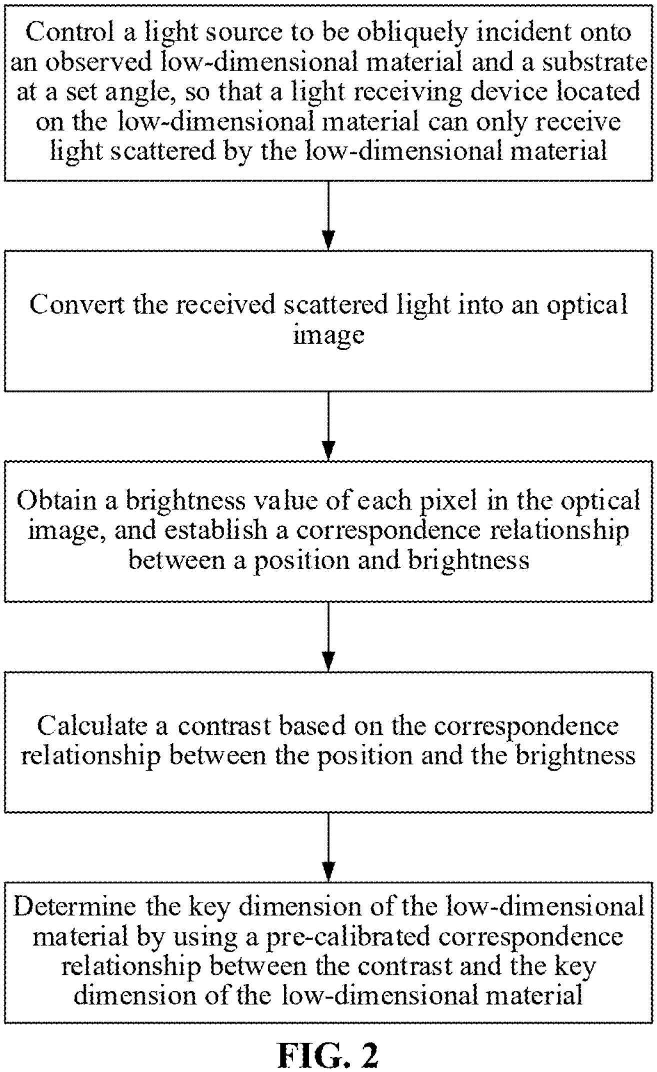
FIG. 2 is a flowchart of a method for determining a key dimension of a low-dimensional material by optical scattering in an embodiment of the present invention.

With reference to FIG. 2, the method of this embodiment specifically includes the following processes:

S101: A light source is controlled to be obliquely incident into a low-dimensional material to be observed and a substrate at a set angle, wherein the set angle is able to enable a light receiving device located above or below the low-dimensional material to be observed to only receive light scattered by the low-dimensional material.

In this embodiment, the light source is controlled to be obliquely incident into the low-dimensional material to be observed and the substrate at the set angle, wherein the set angle is able to enable the light receiving device located above or below the low-dimensional material to be observed to only receive light scattered by the low-dimensional material to be observed, and not receive reflected light. To be specific, the set angle is greater than a maximum acceptance angle of the light receiving device for the reflected light. As a specific example, if the light receiving device is an optical microscope, an angle of incidence of the light source is required to be greater than arctan (N.A.), where N.A. is a numerical aperture of an objective lens of the optical microscope. As a more specific example, a dark-field mode of an optical microscope may be directly used to achieve the purpose of only receiving the light scattered by the low-dimensional material to be observed. The dark-field mode is usually implemented by using an objective lens with the dark-field mode.

At this time, incident light that irradiates the low-dimensional material to be observed is scattered (for example: Rayleigh scattering), and a portion of the scattered light falls within a light collection range of the light receiving device. The reflected light cannot be received by the light receiving device.

S102: The received scattered light is converted into an optical image through an imaging device. This can be achieved by the related art, and will not be elaborated here.

In this embodiment, the light receiving device is configured to receive light, and the imaging device is configured to image the received light. For example: Optical information may be received through an objective lens or an optical microscope, and imaging may be performed through a charge coupled device (CCD) or a complementary metal oxide semiconductor (CMOS) camera. The light receiving device and the imaging device may be separate structures or may be integrally arranged. A person skilled in the art may select an appropriate device according to an actual need. These devices are all easily implemented in the related art.

S103: A brightness value of each pixel in the optical image is obtained, and a correspondence relationship between a position and brightness is established.

In this embodiment, after the optical image is obtained, the brightness value corresponding to each pixel position in the optical image can be read through existing image processing software, so that a position and brightness relationship curve can be drawn.

S104: A contrast is calculated based on the correspondence relationship between the position and the brightness.

In this embodiment, a difference value between the brightness of the low-dimensional material to be observed and the brightness of the substrate is used as the contrast. The brightness of the low-dimensional material to be observed is a maximum brightness value of a low-dimensional material region. The maximum brightness value of this embodiment directly uses a maximum brightness value in the position and brightness relationship curve. Of course, it is easily understood that the maximum brightness value may alternatively be selected in another way. For example: a series of calculation modes for peak features, such as obtaining a peak height, calculating a peak area, and calculating a peak half-width by fitting. The brightness of the substrate is an average brightness value of a substrate region beyond the low-dimensional material.

S105: The key dimension of the low-dimensional material to be observed is determined based on a pre-calibrated correspondence relationship between the contrast and the key dimension of the low-dimensional material to be observed.

In the present embodiment, the correspondence relationships between the contrasts in the optical images converted from the scattered light of the two-dimensional materials, the one-dimensional materials, and the zero-dimensional materials and the key dimensions of these materials are pre-calibrated. The two-dimensional materials are taken as an example. A specific calibration process is described as follows:

S1051: A plurality of different two-dimensional material samples is obtained. For example: Graphene is taken as an example. A plurality of graphene samples is obtained, and a key dimension (thickness or a quantity of layers) of each graphene sample is different.

S1052: For a specific graphene sample, an existing detection method is used, for example: an atomic force microscope method and a scanning electron transmission microscope method, to detect the key dimension of the two-dimensional material samples.

S1053: One of the plurality of graphene samples is placed on a Si/SiO2 substrate, and an optical image is obtained by using the method in S101 to S102. A correspondence relationship between a position and brightness is obtained by using the method in S103, and a contrast is calculated by using the method in S103. Thus, a correspondence array between the contrast and the key dimension of the graphene sample is obtained.

S1054: The process of S1052 to S1053 is performed on each of the plurality of graphene samples, thus obtaining correspondence arrays between the contrasts and the key dimensions of the plurality of graphene samples.

S1055: These arrays are used to obtain correspondence relationship curves between the contrasts and the key dimensions of the graphene samples through curve fitting.

For other two-dimensional materials, such as molybdenum disulfide or boron nitride, the same method may be used to obtain a correspondence relationship curve between the contrast and the key dimension of the molybdenum disulfide or the boron nitride.

For the one-dimensional materials and the zero-dimensional materials, a specific calibration process is the same as that of the two-dimensional material.

As a specific example, the correlation between the key dimension (the thickness or the quantity of atomic layers) and the contrast of the two-dimensional materials obtained in this embodiment is shown in Formula (1):

$$m_{2D} = l_{2D} * d_2^{k2} + s_{2D} \quad (1)$$

In formula (1), $m_{2D}$ is the contrast; $l_{2D}$ is a parameter related to a type of the two-dimensional materials, which is related to a property of the two-dimensional materials; $d_2$ is the key dimension of the two-dimensional materials; k2 is a contrast-key dimension fitting coefficient of the two-dimensional material, a value range of k2 is (1−0.5, 1+0.5), preferably being 1; and $s_{2D}$ is a correction parameter. In the foregoing parameters, specific values of $l_{2D}$ and $s_{2D}$ are related to a type of the two-dimensional materials, and may be specifically obtained through the foregoing calibration process.

Figure 3:
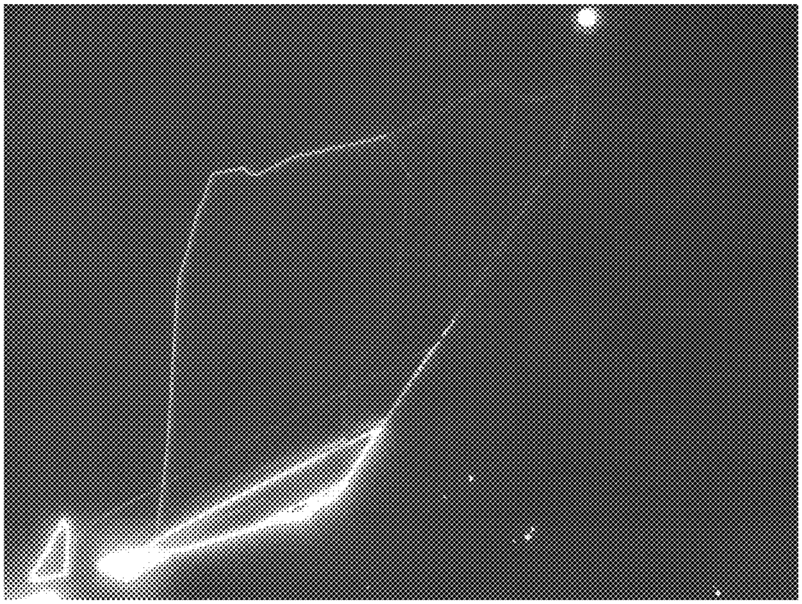
FIG. 3 is an optical image obtained by conversion of scattered light of two-dimensional materials in an embodiment of the present invention.
Figure 4:
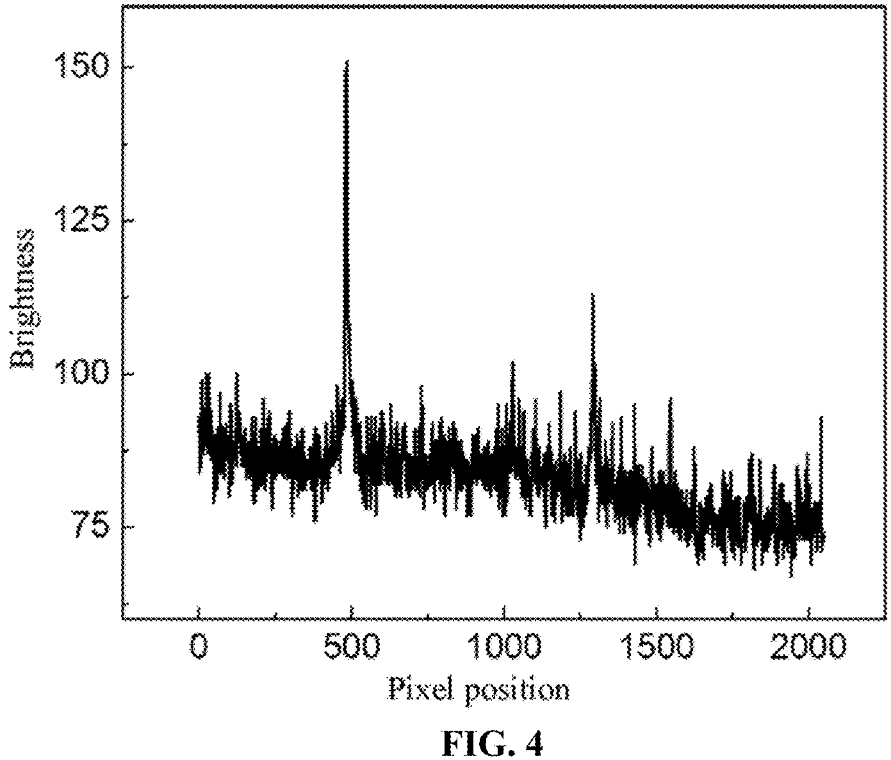
FIG. 4 is a schematic diagram of a relationship between a pixel position and brightness, which is obtained based on the optical image in FIG. 3.
Figure 5:
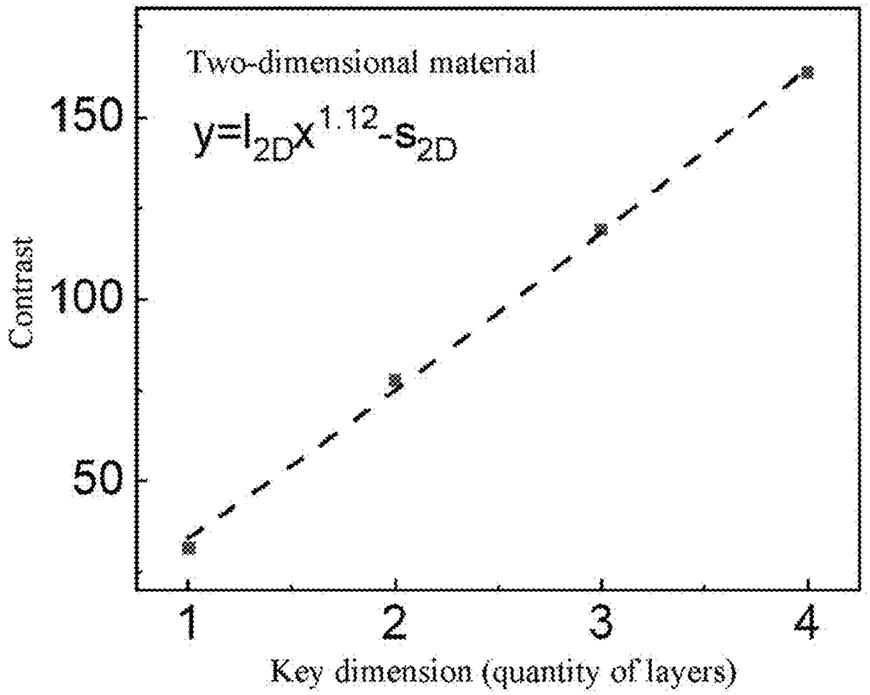
FIG. 5 is a schematic diagram of a contrast-key dimension fitting relationship of the two-dimensional materials in an embodiment of the present invention.

Graphene is taken as an example. FIG. 3 shows an optical image obtained in the following way: using a 50 watt (W) tungsten filament lamp as a light source, obtaining scattered light of a graphene sample by using an optical microscope, and converting the scattered light by exposure by the CCD camera for 2000 milliseconds. FIG. 4 is a schematic diagram of a relationship between a pixel position and brightness, which is obtained based on the optical image, and FIG. 5 is a schematic diagram of a contrast-key dimension fitting relationship of a two-dimensional material.

The correlation between the key dimension (the diameter of the cross section of the one-dimensional material) and the contrast of the one-dimensional materials obtained in this embodiment is shown in Formula (2):

$$m_{1D} = l_{1D} * d_1^{k1} + s_{1D} \tag{2}$$

In formula (2), $m_{1D}$ is the contrast; $l_{1D}$ is a parameter related to a type of the one-dimensional materials, which is related to a property of the one-dimensional materials; $d_1$ is the key dimension of the one-dimensional materials; k1 is a contrast-key dimension fitting coefficient of the one-dimensional materials, a value range of which is (2–0.5, 2+0.5), preferably being 2; and $s_{1D}$ is a correction parameter. Similarly, specific values of $l_{1D}$ and $s_{1D}$ are related to a type of the one-dimensional materials, and may be specifically obtained through the foregoing calibration process.

Figure 6:
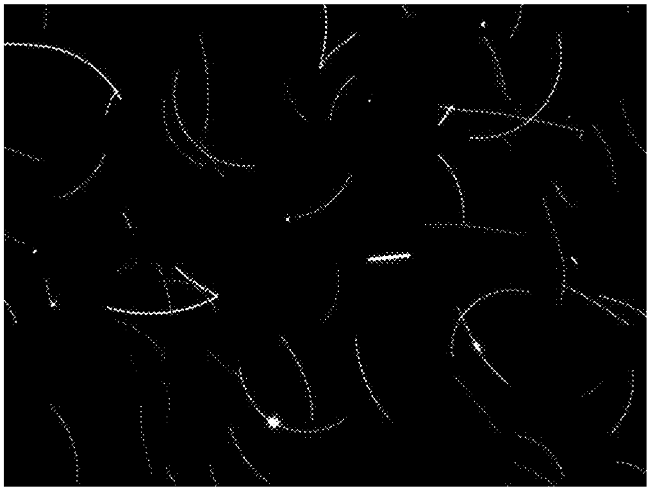
FIG. 6 is an optical image obtained by conversion of scattered light of one-dimensional materials in an embodiment of the present invention.
Figure 7:
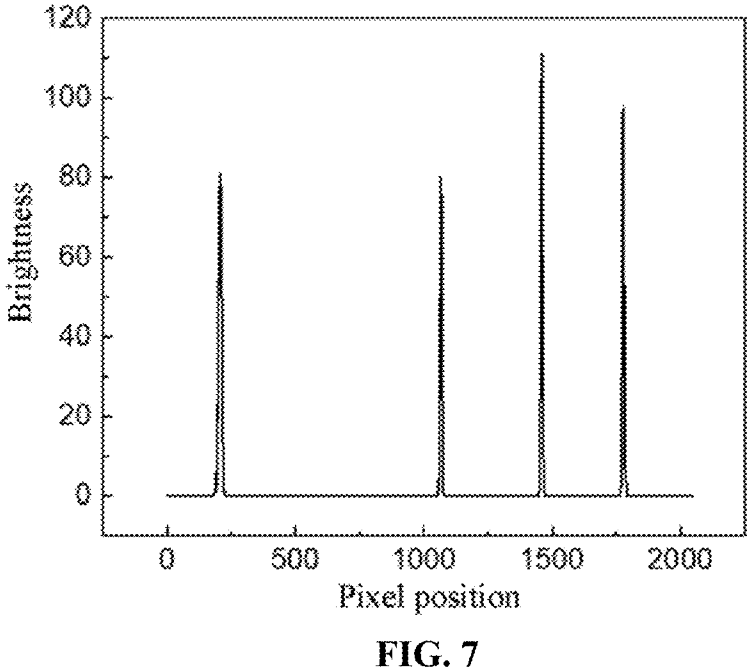
FIG. 7 is a schematic diagram of a relationship between a pixel position and brightness, which is obtained based on the optical image in FIG. 6.
Figure 8:
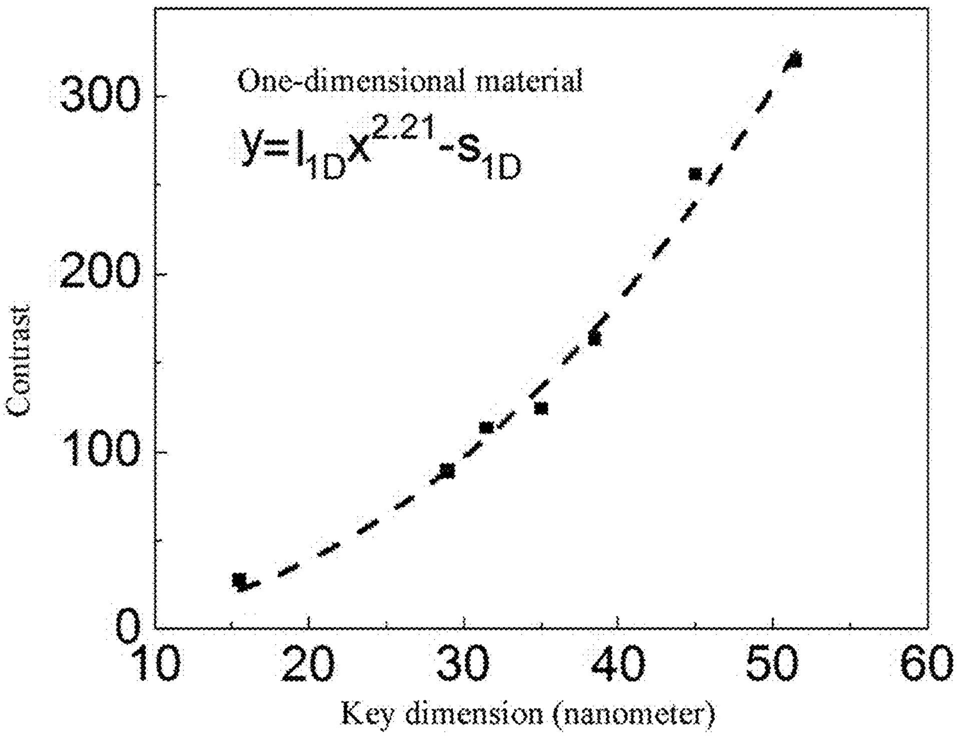
FIG. 8 is a schematic diagram of a contrast-key dimension fitting relationship of the one-dimensional materials in an embodiment of the present invention.

A silver nano wire is taken as an example. FIG. 6 shows an optical image obtained in the following way: using a 50 watt (W) tungsten filament lamp as a light source, obtaining scattered light of a silver nano wire sample by using an optical microscope, and converting the scattered light by exposure by the CCD camera for 1000 milliseconds. FIG. 7 is a schematic diagram of a relationship between a pixel position and brightness, which is obtained based on the optical image, and FIG. 8 is a schematic diagram of a contrast-key dimension fitting relationship of a one-dimensional material.

The correlation between the key dimension (the diameter of the cross section of the zero-dimensional material) and the contrast of the zero-dimensional materials obtained in this embodiment is shown in Formula (3):

$$m_{0D} = l_{0D} * d_0^{k0} + s_{0D} \tag{3}$$

In formula (3), $m_{0D}$ is the contrast; $l_{0D}$ is a parameter related to a type of the zero-dimensional materials, which is related to a property of the zero-dimensional materials; $d_0$ is the key dimension of the zero-dimensional materials; k0 is a contrast-key dimension fitting coefficient of the zero-dimensional materials, a value range of which is (6–3, 6+3), preferably being 6; and $s_{0D}$ is a correction parameter. Similarly, specific values of $l_{0D}$ and $s_{0D}$ are related to a type of the zero-dimensional materials, and may be specifically obtained through the foregoing calibration process.

Figure 9:
FIG. 9 is an optical image obtained by conversion of scattered light of zero-dimensional materials in an embodiment of the present invention.
Figure 10:
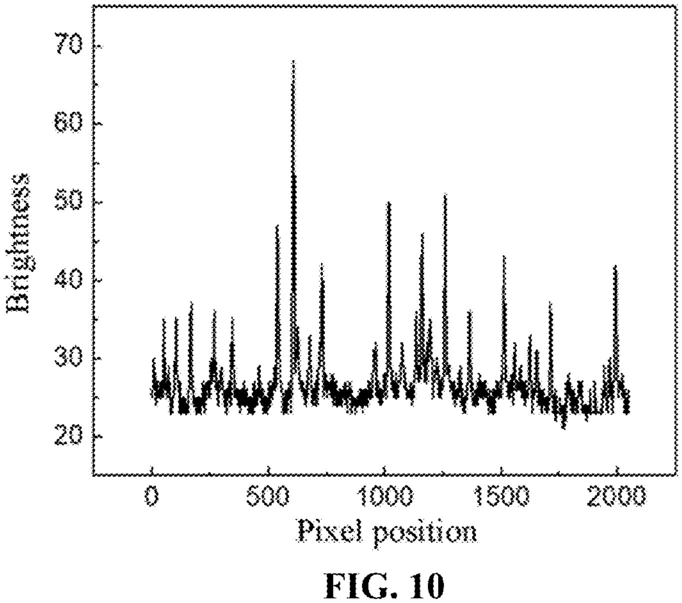
FIG. 10 is a schematic diagram of a relationship between a pixel position and brightness, which is obtained based on the optical image in FIG. 9.
Figure 11:
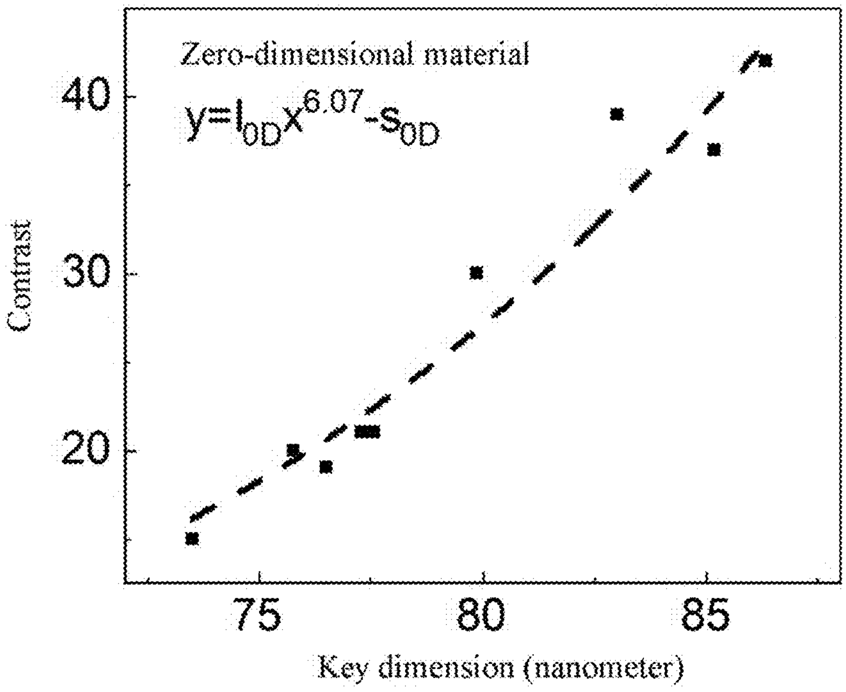
FIG. 11 is a schematic diagram of a contrast-key dimension fitting relationship of the zero-dimensional materials in an embodiment of the present invention.

A polystyrene microsphere is taken as an example. FIG. 9 shows an optical image obtained in the following way: using a 50 watt (W) tungsten filament lamp as a light source, obtaining scattered light of a polystyrene microsphere sample by using an optical microscope, and converting the scattered light by exposure by the CCD camera for 1500 milliseconds. FIG. 10 shows a schematic diagram of a relationship between a pixel position and brightness, which is obtained based on the optical image. FIG. 11 is a schematic diagram of a contrast-key dimension fitting relationship.

Embodiment II

In one or more implementations, a system for determining a key dimension of low-dimensional materials by optical scattering is disclosed, including:

an image obtaining module, configured to: control a light source to be obliquely incident onto a low-dimensional material to be observed and a substrate at a set angle, wherein the set angle is able to enable a light receiving device located above or below the low-dimensional material to be observed to only receive light scattered by the low-dimensional material to be observed; and convert the received scattered light into an optical image;

a position-brightness relationship construction module, configured to: obtain a brightness value of each pixel in the optical image, and establish a correspondence relationship between a position and brightness;

a contrast calculation module, configured to use a difference value between brightness of the low-dimensional material to be observed and brightness of the substrate as a contrast, wherein the brightness of the low-dimensional material to be observed is a maximum brightness value of a low-dimensional material region; the brightness of the substrate is an average brightness value of a region beyond the low-dimensional material to be observed; and a key dimension calculation module, configured to: calculate a contrast based on the correspondence relationship between the position and the brightness, and determine the key dimension of the low-dimensional material to be observed based on a pre-calibrated correspondence relationship between the contrast and the key dimension of the low-dimensional material to be observed.

Specific implementations of the various foregoing modules have been described in detail in Embodiment I, and will not be elaborated here.

The specific implementations of the present invention are described above with reference to the accompanying drawings, but are not intended to limit the protection scope of the present invention. A person skilled in the art should understand that various modifications or deformations may be made without creative efforts based on the technical solutions of the present invention, and such modifications or deformations shall fall within the protection scope of the present invention.

The invention claimed is:

1. A method for determining a key dimension of low-dimensional materials by optical scattering, comprising:

controlling a light source to be obliquely incident onto a low-dimensional material to be observed and a substrate at a set angle, wherein the set angle is able to enable a light receiving device located above or below the low-dimensional material to be observed to only receive light scattered by the low-dimensional material to be observed;

converting the received scattered light into an optical image;

obtaining a brightness value of each pixel in the optical image, and establishing a correspondence relationship between a position and brightness;

using a difference value between brightness of the low-dimensional material to be observed and brightness of the substrate as a contrast, wherein the brightness of the low-dimensional material to be observed is a maximum brightness value of a low-dimensional material region; the brightness of the substrate is an average brightness value of a region beyond the low-dimensional material to be observed; and calculating a contrast based on the correspondence relationship between the position and the brightness, and determining the key dimension of the low-dimensional material to be observed by using a pre-calibrated correspondence relationship between the contrast and the key dimension of the low-dimensional material to be observed.

2. The method for determining the key dimension of the low-dimensional materials by optical scattering according to claim 1, wherein when the low-dimensional material to be observed is a two-dimensional material, the key dimension of the two-dimensional material is a thickness or a quantity of atomic layers; and the correspondence relationship between the contrast and the key dimension of the two-dimensional material is:

$$m_{2D} = l_{2D} * d_2^{k2} + s_{2D}$$

wherein, $m_{2D}$ is the contrast; $l_{2D}$ is a parameter related to a type of the two-dimensional material, which is related to a property of the two-dimensional material; $d_2$ is the key dimension of the two-dimensional material; and k2 is a contrast-key dimension fitting coefficient of the two-dimensional material, a value range of which is (1−0.5, 1+0.5); and, $s_{2D}$ is a correction parameter.

3. The method for determining the key dimension of the low-dimensional materials by optical scattering according to claim 1, wherein when the low-dimensional material to be observed is a one-dimensional material, the key dimension of the one-dimensional material is a diameter of a cross section; the correspondence relationship between the contrast and the key dimension of the one-dimensional material is:

$$m_{1D} = l_{1D} * d_1^{k1} + s_{1D}$$

wherein, $m_{1D}$ is the contrast; $l_{1D}$ is a parameter related to a type of the one-dimensional material, which is related to a property of the one-dimensional material; $d_1$ is the key dimension of the one-dimensional material; k1 is a contrast-key dimension fitting coefficient of the one-dimensional material, a value range of which is (2−0.5, 2+0.5); and, $s_{1D}$ is a correction parameter.

4. The method for determining the key dimension of the low-dimensional materials by optical scattering according to claim 1, wherein when the low-dimensional material to be observed is a zero-dimensional material, the key dimension of the zero-dimensional material is a diameter of the zero-dimensional material; the correspondence relationship between the contrast and the key dimension of the zero-dimensional material is:

$$m_{0D} = l_{0D} * d_0^{k0} + s_{0D}$$

wherein, $m_{0D}$ is the contrast; $l_{0D}$ is a parameter related to a type of the zero-dimensional material, which is related to a property of the zero-dimensional material; $d_0$ is the key dimension of the zero-dimensional material; k0 is a contrast-key dimension fitting coefficient of the zero-dimensional material, a value range of which is (6−3, 6+3); and, $s_{0D}$ is a correction parameter.

5. The method for determining the key dimension of the low-dimensional materials by optical scattering according to claim 1, wherein a process of pre-calibrating the correspondence relationship between the contrast and the key dimension of the low-dimensional material to be observed is specifically as follows:

detecting the key dimension of the low-dimensional material by using an existing detection mode;

calculating the contrast corresponding to the low-dimensional material to be observed according to the method according to claim 1;

obtaining a correspondence array between the contrast ratio and the key dimension of the low-dimensional material to be observed; and fitting a plurality of correspondence arrays to obtain a correspondence relationship curve between the contrast and the key dimension of the low-dimensional material to be observed.

6. The method for determining the key dimension of the low-dimensional materials by optical scattering according to claim 1, wherein the light source is controlled to be obliquely incident onto the low-dimensional material to be observed and the substrate at the set angle, and the set angle is greater than a maximum acceptance angle of the light receiving device for reflected light.

7. The method for determining the key dimension of the low-dimensional materials by optical scattering according to claim 1, wherein the light source emits an electromagnetic wave that covers all electromagnetic wavelengths.

8. The method for determining the key dimension of the low-dimensional materials by optical scattering according to claim 1, wherein the light source emits an optical wave, and a wavelength of the optical wave covers all optical bands.

9. The method for determining the key dimension of the low-dimensional materials by optical scattering according to claim 8, wherein an optical band covered by the wavelength of the optical wave emitted by the light source is 1 to 3000 nm;

or, an optical band covered by the wavelength of the optical wave emitted by the light source is 300 to 800 nm.

* * * * *